United States Patent [19]

Rand

[11] Patent Number: 4,848,705
[45] Date of Patent: Jul. 18, 1989

[54] MODULAR SPACE VEHICLE FOR DEEP SPACE APPLICATIONS

[76] Inventor: Harry Z. Rand, 66 Tony Ct., Greenbriar, Brick, N.J. 08723

[21] Appl. No.: 73,439

[22] Filed: Jul. 15, 1987

[51] Int. Cl.$^4$ .............................. B64G 1/00
[52] U.S. Cl. .............. 244/158 R; 244/161; 244/159
[58] Field of Search .......... 244/158 R, 159, 161; 52/DIG. 10, 81, 236.1; D12/319–323

[56] References Cited

U.S. PATENT DOCUMENTS

| | | | |
|---|---|---|---|
| 3,210,026 | 10/1965 | Frisch | 244/159 |
| 3,251,995 | 5/1966 | Denney | 244/158 |
| 3,534,926 | 10/1970 | Wuenscher | 244/159 |
| 3,665,882 | 5/1972 | Georgier | 52/DIG. 10 |
| 3,907,225 | 9/1975 | Welther | 244/158 R |
| 4,057,207 | 11/1977 | Hogan | 52/DIG. 10 |
| 4,471,926 | 9/1984 | Steel, III | 244/158 R |
| 4,548,004 | 10/1985 | Chastain | 52/DIG. 10 |
| 4,635,885 | 1/1987 | Hujsak | 244/169 |
| 4,728,060 | 3/1988 | Cohen | 244/158 R |

FOREIGN PATENT DOCUMENTS 2029714  3/1980 United Kingdom ............ 244/13

OTHER PUBLICATIONS

Greger, Gottfried, The German Material Processing in Space Activities, pp. 93–95, 99.
Gurzadyan, G. A. et al., "Space Astrophysical Observatory 'Orion-2'", Astrophysics and Space Science, vol. 40, No. 2, Apr. 1976, pp. 408–409.
NASA FATS, vol. II, No. 10, Biosatellites, pp. 1, 3–6.
McGarth, A. et al., "Use of Pallet-Type Structures in Shuttle-Attached and Free-Flying Modes", Acta Astronautica, vol. 7, No. 11, Nov. 1980, p. 1256.

Primary Examiner—Sherman D. Basinger
Assistant Examiner—Gregory R. Smith
Attorney, Agent, or Firm—Larson and Taylor

[57] ABSTRACT

A modular space vehicle comprises a main tetrahedral propulsion unit with individual drive engines located at each corner of the tetrahedron forming the main unit. The engines are pivotably mounted so as to enable the direction of the thrust produced thereby to be varied. Hemispheric cargo units are mounted on the faces of the main unit, and cooperating hatches in the units permit access to the cargo unit from a crew compartment located in the main tetrahedron unit. The cargo units may include auxiliary engines to provide additional maneuverability.

12 Claims, 1 Drawing Sheet

MODULAR SPACE VEHICLE FOR DEEP SPACE APPLICATIONS

FIELD OF THE INVENTION

The present invention relates to space vehicles and is particularly concerned with, but is not limited to modular deep-space vehicles adapted to be constructed in space under zero-gravity, low external pressure conditions.

BACKGROUND OF THE INVENTION

Manned exploration, and commercial utilization of space transportation, will require a class of vehicle and manufacturing techniques which have no earthbound precedent. Near-earth vehicles now being used are and will be of limited applicability because of the much different demands placed on deep-space vehicles. Past unmanned space vehicles as well as manned space vehicles do not serve as appropriate models from which to analogize larger more advanced versions applicable to deep space. An entirely new class of vehicle is required as well as construction techniques which are completely different from those currently used. In this regard, the very characteristics that make current space vehicles useful are, and will be, detrimental to successive generations of vehicles of a class which will not be launched from earth, will not re-enter the earth's atmosphere, and will not even depend on "launch" vehicles for assistance (since the new vehicles will already have been built in deep space). The present invention is concerned with space-going vehicles in general but is particularly concerned with deep-space vehicles which will be constructed in space and which will never traverse a planetary atmosphere.

As discussed below, the present invention is concerned with a space vehicle that is not intended to assist in achieving orbit above a planet, or re-entry through an atmosphere, or to withstand close planetary gravity. The invention is concerned with the need to maximize efficient construction and operation in a zero-gravity, low external pressure setting, particularly with respect to operation under deep-space conditions. These conditions dictate that a number of different considerations be addressed including problems of efficient containment of cargo, ease and speed of loading the cargo and the safe storage thereof, maximization of crew safety with respect to movement of cargo as well as particle or radiation penetration of the crew compartment, utilization of component materials of maximum structural strength so as to enable such cargo to be carried, efficient engine placement and protection of engine from damage either from cargo movement or leakage, external radiation, or high-velocity particles, and compact displacement of the gross mass of the vehicle (constituted by the vehicle construction itself, the crew, engines and cargo) around the center of gravity to minimize angular momentum and thereby maximize maneuverability as well as fuel savings.

SUMMARY OF THE INVENTION

The present invention represents a departure from space vehicles as utilized in the past (and as foreseeable in the near future) and overcomes problems associated with such vehicle constructions if applied to deep-space conditions. These problems include lack of suitability for use in all regions of space, high cost, high weight/mass to payload/freight ratio, excessive complexity, high design cost associated with "custom-made" vehicles, and decreased performance expectations for deep space missions. The space vehicle of the present invention overcomes these problems and provides decided advantages in deep space applications over all space vehicles presently in use.

In accordance with the present invention, a safe, inexpensive, efficient vehicle is provided which is of a modular construction and which uses a tetrahedron as the basic vehicle body. A tetrahedron basically possesses the most external surface for unit of internal material in a simple shape and thus generally maximizes the possibilities with respect to the attachment of cargo modules thereto. A tetrahedron also provides the greatest ratio of volume-to-unit construction so that the inherent strength thereof is generally the greatest of any simple form. The tetrahedron used is comprised of flat sided triangles regardless of the size of the vehicle constructed in accordance with the present invention.

In accordance with a first aspect of the present invention the tetrahedron vehicle body or unit contains the crew quarters, engines and all other major support features of the modular ship or vehicle of the invention. Crew quarters are housed within a secondary containing form to add internal structural integrity to the overall vehicle design and to shield the crew from leaks within the engine compartments located at the vertices or corners of the tetrahedron. The shape of the internal supporting unit which surrounds the crew quarters can be varied depending upon vehicle class in accordance with the requirements of engine design and the internal storage requirements of the vessel. Thus, the shape of the secondary containing unit, i.e., the crew compartment, can take a number of forms including a further, smaller tetrahedron within the main tetrahedron, a sphere, or simply a confined space "left over" when the primary (drive) engines and secondary (support) engines are installed in the vehicle.

A further important feature of the invention concerns the location of main engine ports. In particular, regardless of the type or types of power drive source used, these ports are mounted at the vertices of the tetrahedron. Advantageously, the engines used are mounted in nozzles or other pivotable mounting arrangements so that the engines may be swiveled or otherwise varied in position so as to provide directionality to the engine thrust. With the engine so mounted they can move the ship (and its cargo) around its own center of gravity when making navigational adjustments, or reversing the direction of thrust, with the least angular momentum and the least torque (with the exception of a simple sphere) developed on the structural elements.

Thus, an important feature of the present invention is that the overall mass of the vehicle, as well as the externally carried cargo is assembled in the tightest possible mass consistent with easy stowage of freight or other payload. To achieve this, a set of modular hemispheric containers or cargo units are provided which are mounted on the external surfaces of the basic tetrahedron. Such hemispheres generally contain the most interior volume for the least external exposure, and provide a minimum use of materials per contained unit of volume. These cargo units are adapted to carry cargo, freight or any other payload that the vehicle is to deliver and in this latter regard, these units can carry a mission payload for monitoring and recording information during travel of the vehicle. The hemispherical units are self-contained and, as stated, are mounted externally of the main or central tetrahedral engine-crew module which forms the propulsion unit for the vehicle.

A further important feature of the invention is that the size of the hemispheric cargo modules are standardized together with the tetrahedral units in which the engine and crew quarters are located. The hemispheric cargo units are attached to the center of each face of the external surfaces of the tetrahedral propulsion unit so that the outer edges of the cargo containers are located at or near the edges of the main tetrahedral unit at three points for each cargo unit. The hemispheric cargo units are secured in place at these points and thus are braced and supported by the strongest construction elements of the frame of the tetrahedral body. At the same time, easy access is provided to the securing elements.

The cargo units can be prefabricated to be accommodated by similarly standardized propulsion plant (tetrahedral) units an this arrangement provides the advantage that the hemispheric cargo modules can be secured easily to the exterior of the vehicle at the three points where the circumference of the cargo module contacts the edges of the tetrahedral propulsion unit. Further, connection and disconnection of the cargo modules can be carried out very rapidly, as required, so that cargo units which are delivered to their destination ca be dropped off quickly and new, refilled cargo modules can be rapidly attached to replace the disconnected or uncoupled units. Using this approach, the contents of the container modules do not have to be dealt with in any way and can be off-loaded or processed, under controlled circumstances, at some distance from the main ship or vehicle. Further, neither the vehicle nor the cargo pose any danger to each other during loading or off-loading. When the cargo units are attached as described, all work in loading them can be carried out from outside of the vessel, thus maintaining the integrity of the crew environment during this process.

A further important feature of the invention is that the hemispheric cargo modules or units can be loaded to maximum capacity at a centrally, conveniently located place such as a depot or station. Alternatively, the cargo modules can be loaded without the facilities of such a depot (depending on the cargo in question, the surrounding circumstances and the delivery schedule of the vehicle) and, in any application, the cargo units can be stowed in the most efficient manner for that voyage without any engagement with the crew of the vehicle and without taking away time or energy from the operation of the vehicle. In particular, these modular units can be filled to their capacity without having to enter the superstructure of the basic deep-space vehicle, and this therefore eliminates the threat of shifting cargo which would otherwise jeopardize the structural integrity of the crew quarters or even the basic structural integrity of the tetrahedral unit.

A further important aspect of the invention concerns the fact that the modular hemispheric containers, being located external to the crew quarters, act as a radiation or particle shields for the crew. In other words, radiation or high-speed particles which collide with the vehicle in flight must traverse the cargo container to enter the crew quarters which are located in the center of the main tetrahedral unit and any problem with energy absorbed by the primary collision with the cargo units is far less significant than that which would be caused by violating the central unit. In this regard, any damage caused to a hemispheric container will not affect the basic operation of the vehicle as a whole and under extreme conditions, the cargo units can be rapidly jettisoned, as required, without endangering the crew or the mission.

As noted above, a further important feature of the invention is the enhancement of the mass distribution through the use of a modular construction. Because of the manner in which the cargo containers are positioned at the outside of the main vehicle, the cargo containers do not provide an asymmetrical mass which would distort the thrust of the engines during maneuvering. This arrangement enhances maneuverability, helps instrument calibration, and provides improvement with respect to overall maintenance as well as with regard to the basic operation of the vehicle.

Other features and advantages of the invention will be set forth in, or will be apparent from, the detailed description of preferred embodiments which follows.

DESCRIPTION OF THE PREFERRED EMBODIMENTS

Figure 1:
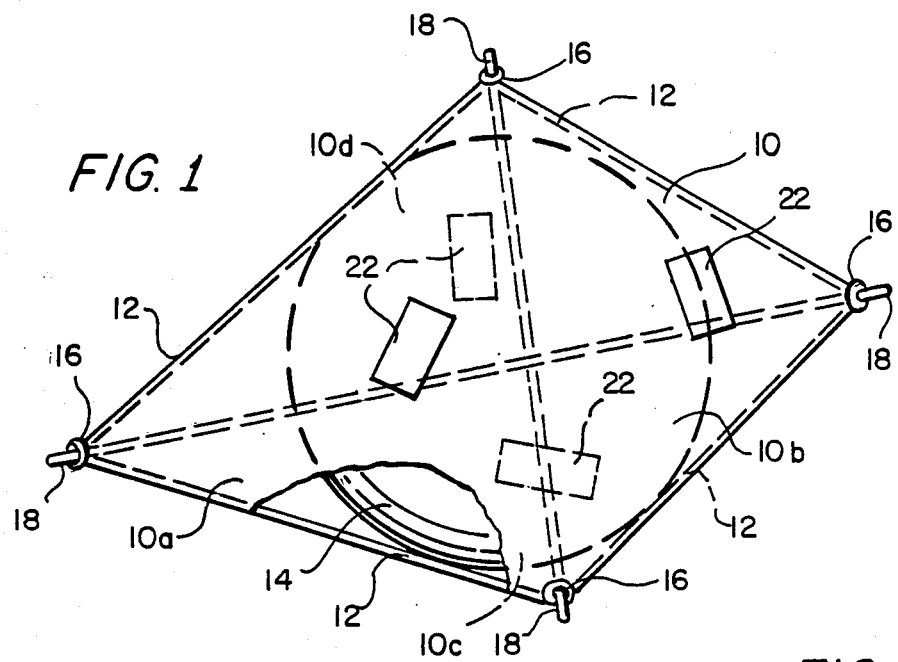
FIG. 1 is a perspective view of the basic tetrahedral propulsion unit with the cargo units removed.

Referring to FIG. 1, a deep-space vehicle is shown which is constructed in accordance with the present invention which includes a basic tetrahedron body 10 having four flat triangular faces 10a, 10b, 10c and 10d. As discussed above, a tetrahedron provides substantial advantages over other simple shapes and, in general, possess the most external surface for unit of internal material in a simple shape. The tetrahedron body 10 which forms the basic vehicle includes support frames 12 along the lateral edges thereof where the adjacent surfaces meet. A crew compartment 14 is formed within tetrahedron 10 and, as noted above, compartment 14 can take a number of different shapes. In the specific embodiment illustrated, crew compartment 14 comprises a sphere, although, as noted, alternate shapes include a smaller tetrahedron or simply a shape dictated by the "left-over" space not occupied by the individual propulsion units.

Engine ports 16 are provided at each of the corners or vertices of the tetrahedron 10 and include corresponding engines 18 mounted therein. As illustrated schematically in FIG. 2, a gimbal mounting 20 is provided for each engine 18 so that the direction of the thrust provided by the engine can be varied. It will be appreciated that the propulsion units used, as well as the mounting assemblies therefor, can take a number of different forms suitable to the purposes of the invention.

Figures 2, 3:
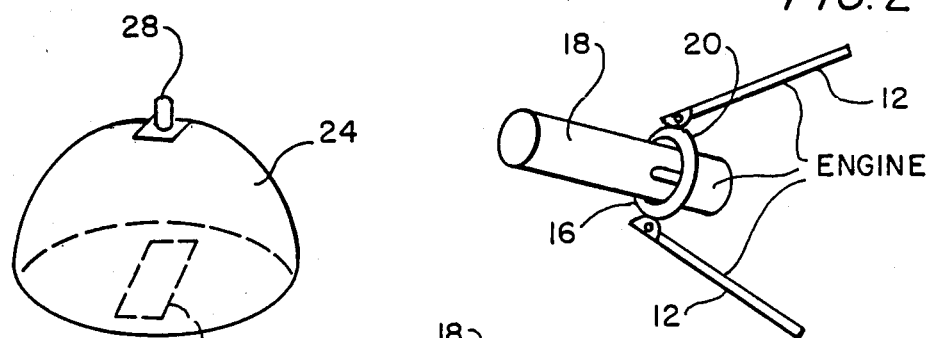
FIG. 2 is a detail illustrating, in a schematic manner, the mounting for one of the thrust engines of FIG. 1.
FIG. 3 is a perspective view of a cargo unit or module.
Figure 4:
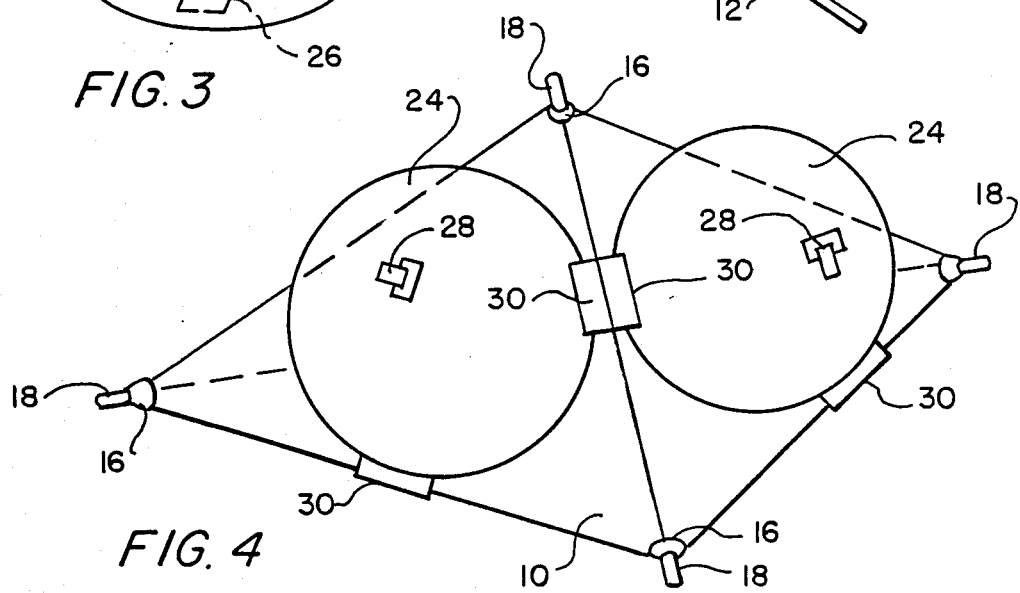
FIG. 4 is a perspective view of the vehicle of the invention with the cargo units or modules in place.

As illustrated in FIG. 1, a cargo door 22 is preferably provided in each external face of tetrahedron 10. The cargo doors enable access to associated hemispheric cargo units 24 illustrated in FIGS. 3 and 4. In particular, as shown in FIG. 3, each cargo unit 24 includes a cargo door 26 which, when cargo units 24 are mounted in place on the faces 10a, 10b, 10c and 10d of main vehicle 10, register with the corresponding doors 22 formed in these faces, as discussed above in connection with FIG. 1.

Hemispheric cargo units 24 also include optional auxiliary engines 28 used to provide additional maneuverability for the space craft when the cargo units 24 are in place.

As discussed above, fasteners generally denoted 30, are provided at each point where the circumference of the hemispheric cargo containers 24 lie at or close to the edge of the face of the tetrahedron surface on which the container is located. There are three of these points or locations for each cargo container 24 and fasteners 30 thus provide an efficient way in which to mount the cargo containers 24 onto the main tetrahedron body 10, and to dismount the containers 24 therefrom. Fasteners 30 may take a number of different conventional forms but preferably comprise a quick-disconnect clamp or the like so as to enable ready off-loading of the containers 24 from the tetrahedron 10.

It will be appreciated that modularizing the construction of a space-going vehicle as provided in accordance with the present invention provides decided advantages over space craft of the prior art wherein each ship is "handmade" and thus very expensive to construct. The present invention permits the provision of a fleet a vehicles with interchangeable main bodies or hulls corresponding to tetrahedron 10, cargo containers corresponding to modular cargo units 24 and propulsion units corresponding to propulsion units 18. Moreover, the externally mounted hemispheric cargo units 24 themselves provide significant advantages including the fact that the registering hatches or doors 22 and 26 enable the crew access to the cargo during travel. Moreover, this cargo can include extra supplies for the crew or materials for their use during flight, as well as instruments for manning a vehicle or maintaining the vehicle during flight. Other features and advantages have been discussed above.

Although the present invention has been described relative to preferred embodiments thereof, it will be understood by those skilled in the art that variations and modifications can be effected in these preferred embodiments without departing from the scope and spirit of the invention.

What is claimed is:

1. A space vehicle particularly adapted for use in deep space under zero-gravity, low external pressure conditions, said vehicle comprising a vehicle body in the shape of a tetrahedron, propulsion means located at each vertex of the tetrahedron body, at least one modular hemispherical cargo unit detachably mounted at the base thereof on at least one external triangular surface of the tetrahedron body and means for providing access to the interior of the cargo unit from inside of the vehicle body, the radius of said hemispherical cargo unit being such that edge portions thereof are disposed substantially adjacent to each of the three lateral edges of the triangular surface on which the cargo unit is mounted and such that the base of the cargo unit substantially fills the central area of the triangular surface.

2. A space vehicle as claimed in claim 1 comprising a plurality of said cargo units, each of said units being mounted on a separate external surface of said tetrahedron body.

3. A space vehicle as claimed in claim 2, wherein said cargo units extend to the joining edges of the external surface of the tetrahedron body and said vehicle further comprises securing means, located at said edges, for securing said units to the tetrahedron body.

4. A space vehicle as claimed in claim 1 comprising four of said cargo units, each of said units being mounted on a different external surface of said tetrahedron body.

5. A space vehicle as claimed in claim 4 wherein each of said cargo units includes an auxiliary propulsion means located at the center thereof for assisting in maneuvering.

6. A space vehicle as claimed in claim 1 wherein each of said propulsion means comprises a thrust producing engine and engine mounting means for mounting the engine so as to vary the direction of the thrust produced by the engine.

7. A space vehicle as claimed in claim 6 wherein said engine mounting means comprises a gimbal mounting device.

8. A space vehicle as claimed in claim 1 wherein at least one of the faces of said tetrahedron body has an entry hatch therein.

9. A modular vehicle particularly adapted for use in deep space, said vehicle comprising; a main tetrahedron body, means defining a crew compartment within said body, propulsion means mounted within said body for propelling the body; at least one hemispherical modular cargo container detachably mounted at the base thereof on at least one external triangular surface of the body and means for providing access to the interior of the cargo unit from inside of the vehicle body, the radius of said hemispherical cargo unit being such that edge portions thereof are disposed substantially adjacent to each of the three lateral edges of the triangular surface on which the cargo unit is mounted and such that the base of the cargo unit substantially fills the central area of the triangular surface.

10. A modular vehicle as claimed in claim 9 comprising a plurality of said cargo containers each mounted on a different external surface of said tetrahedron body.

11. A modular vehicle as claimed in claim 10 wherein said propulsion means comprises a propulsion engine mounted to each of the vertices of said body.

12. A modular vehicle as claimed in claim 11 further comprising means for mounting said engines so as to permit variation of the direction of engine thrust.

* * * * *